Aug. 13, 1968   F. N. ADAMS ET AL   3,396,677
SHAPED DOUGHNUT CUTTING DEVICE

Filed June 3, 1966   2 Sheets-Sheet 1

INVENTORS
FLOYD ADAMS, VICTOR D. COOPER,
JOHN E. SOMMERS
BY
William R. Lieberman
ATTORNEY Aug. 13, 1968     F. N. ADAMS ET AL     3,396,677
SHAPED DOUGHNUT CUTTING DEVICE
Filed June 3, 1966     2 Sheets-Sheet 2
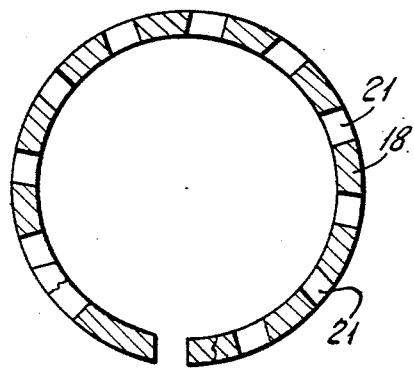
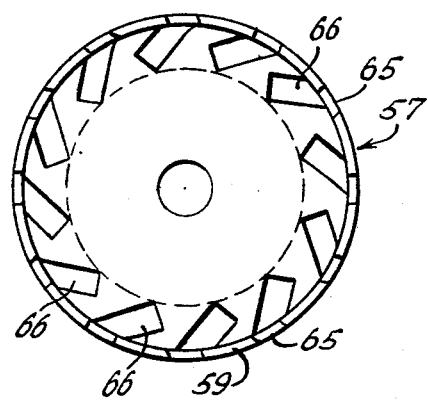
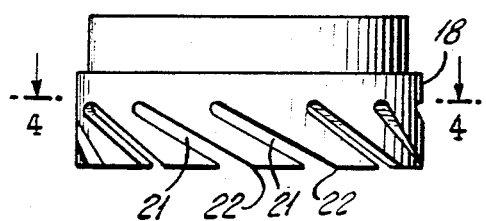
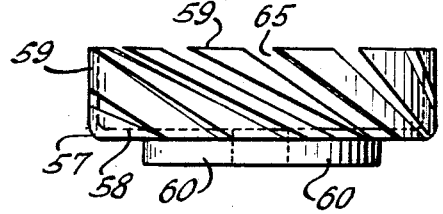
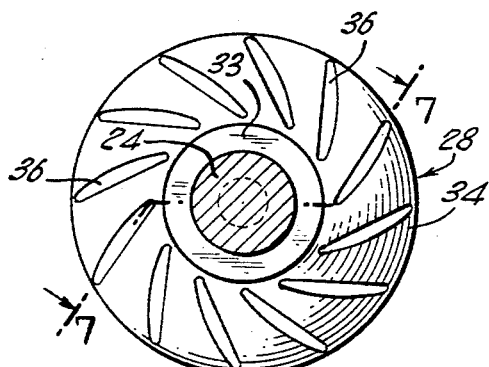
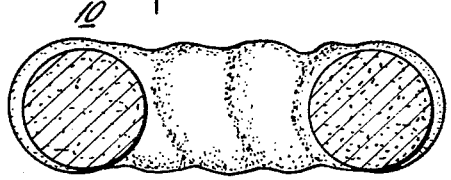
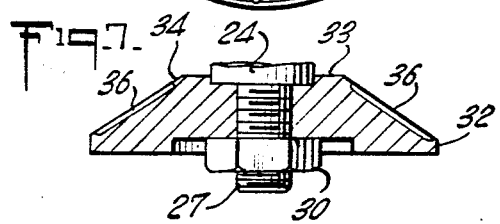
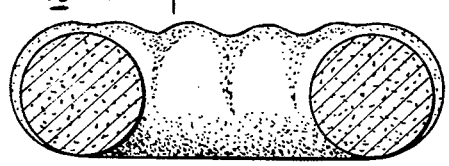
INVENTORS
FLOYD ADAMS, VICTOR D. COOPER,
JOHN E. SOMMERS
BY
William R. Lieberman
ATTORNEY United States Patent Office 3,396,677
Patented Aug. 13, 1968

1

3,396,677
SHAPED DOUGHNUT CUTTING DEVICE
Floyd N. Adams, Westbury, Victor D. Cooper, Jamaica, and John E. Sommers, Valley Stream, N.Y., assignors to DCA Food Industries Inc., New York, N.Y.
Filed June 3, 1966, Ser. No. 555,111
4 Claims. (Cl. 107—14)

ABSTRACT OF THE DISCLOSURE

An apparatus for producing French cruller-shaped dough pieces includes a vertical tubular nozzle connected to a pressurized dough source and having inclined slots in its bottom peripheral wall, a coaxial closure disc positioned below the nozzle, and a cutter sleeve slideably engaging the nozzle and movable between a lowered closed position engaging the disc and a raised position exposing the slots. The disc has grooves in its upper face extending along the directions of the slots or a wall, is formed across the bottom of the nozzle and has slots therein connected to the inclined slots.

---

The present invention relates generally to improvements in devices for the production of comestibles. It relates particularly to an improved apparatus for the shaping of dough into rings having the appearance of French cruller rings.

Cakes such as ring doughnuts are generally produced by forming pieces of dough in the shape of rings and then frying the dough pieces. An apparatus which is widely employed for forming the ring shaped dough pieces includes a tubular nozzle connected to a reservoir of dough under a pressure of compressed air and having a bottom opening below which is supported a cutter disc to delineate an annular extrusion opening. A reciprocating cutter sleeve is slidable along the nozzle in a reciprocating stroke past the cutter disc to periodically open the annular extrusion opening permitting the radial extrusion of dough, the cutter sleeve effecting the cutting of the extruded dough into a ring upon the closing of the extrusion opening, the dough ring dropping from the nozzle. An apparatus of the above nature is described in U.S. Patent No. 3,143,085, granted Aug. 4, 1964, to J. G. Gebhardt et al., and produces dough rings having substantially smooth surfaces. A form of ring doughnut known as a French cruller is widely produced and is distinguished in shape from that of the common ring doughnut in that a surface thereof is provided with regularly spaced curved valleys and arcuate ridges or swirls. The conventional dough ring extrusion apparatus of the above type heretofore available was not capable of producing French cruller or swirled dough pieces. While mechanisms have been proposed and employed for the production of French cruller shaped dough pieces these possess numerous drawbacks and disadvantages. They are complicated and unreliable devices, of little flexibility and of limited application, and otherwise leave much to be desired.

It is, therefore, a principal object of the present invention to provide an improved apparatus for the shaping of dough pieces.

Another object of the present invention is to provide an improved apparatus for the extrusion and cutting of rings of dough.

Still another object of the present invention is to provide an improved apparatus for forming French cruller shaped dough rings having swirled surfaces.

A further object of the present invention is to provide an improved apparatus for producing French cruller type of dough rings wherein conventional dough ring extrusion equipment may be employed to great advantage.

2

Still a further object of the present invention is to provide an apparatus of the above nature characterized by the simplicity, reliability and adaptability thereof.

The above and other objects of the present invention will become apparent from a reading of the following description taken in conjunction with the accompanying drawings, wherein:

FIGURE 4 is a sectional view taken along line 4—4 in FIGURE 5;

FIGURE 5 is a front elevational view of the extrusion nozzle tip of the mechanism shown in FIGURE 2;

FIGURE 6 is a top plan view of the cutter disc thereof;

FIGURE 7 is a sectional view taken along line 7—7 in FIGURE 6;

FIGURE 8 is a transverse sectional view of one shape of dough piece produced by the mechanism illustrated in FIGURE 2;

FIGURE 9 is a top plan view of the extrusion nozzle die of the mechanism shown in FIGURE 3;

FIGURE 10 is a front elevational view thereof; and

FIGURE 11 is a transverse sectional view of one shape of dough piece produced by the mechanism of FIGURE 3.

In a sense the present invention contemplates the provision of a shaped dough ring forming apparatus which comprises a tubular extrusion nozzle having a bottom discharge opening and provided with circumferentially spaced openings in the bottom peripheral wall thereof, a disc member coaxially supported below said extrusion nozzle, and a sleeve member slidably engaging said extrusion nozzle and reciprocatable between an open position exposing said circumferentially spaced openings and a closed position substantially in engagement with said disc member. The circumferentially spaced openings are advantageously defined by inclined slots formed in and extending upwardly from the bottom edge of the extrusion nozzle. In addition, there are advantageously formed in the upper face of the disc grooves vertically aligned with and extending along the direction of the slots, or a wall is provided in registry with the nozzle bottom opening and has radially angular slots formed therein connected with corresponding slots in the nozzle peripheral wall.

Figure 1:
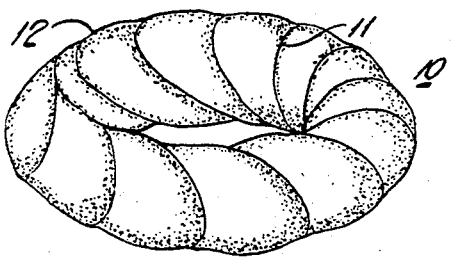
FIGURE 1 is a perspective view of a doughnut of the type produced in accordance with the present invention.
Figure 2:
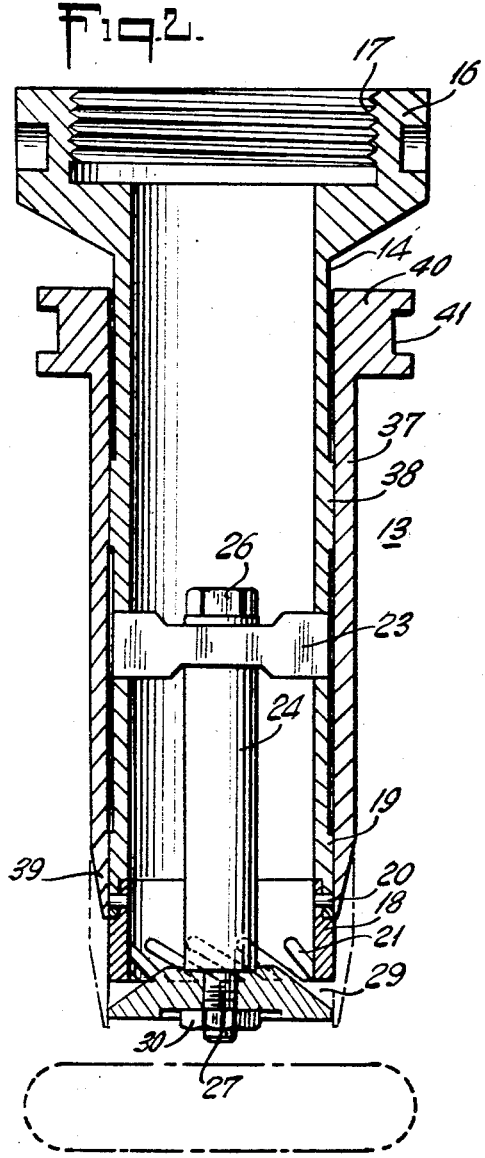
FIGURE 2 is a medial vertical sectional view of a dough extruding and forming mechanism constructed according to and embodying the present invention.

In FIGURE 1 of the drawing there is illustrated a fried cake 10 of the French cruller type and of a shape which may be produced by employing the present apparatus. A French cruller is made from an especially formulated batter and after frying can be described as having the toroidal shape of a ring doughnut, a stable structure, a very open crumb formation, and an exterior surface on one side interrupted by a plurality of regularly spaced curved helical valleys or swirls 11 which delineate curved helical ridges 12 which characterized the French cruller.

Referring now to FIGURES 2 and 4 to 7 of the drawings forming a part hereof, which illustrate a preferred form of the improved apparatus and which may be employed to great advantage in practicing the present method, reference numeral 13 generally designates the improved dough extrusion and shaping mechanism. The extrusion mechanism 13 includes a vertically extending tubular nozzle 14 of circular cross section terminating at its top in an enlarged coupling head 16 having a threaded cylindrical inside face 17 of greater diameter than that of the nozzle 14 to facilitate the connection of the nozzle to an externally threaded coupling outlet pipe depending from a dough-containing hopper or tank in the manner well known in the art, the hopper being under an adjustable pressure of compressed air to urge the dough from the hopper through nozzle 14.

The lower end of nozzle 14, in accordance with the present invention, is provided with an extrusion die or tip 18 of tubular configuration, having an inside diameter equal to that of nozzle 14. The bottom inner face of nozzle 14 is stepped and the upper outer face of the die 18 is correspondingly stepped and matingly engages the inner step of the nozzle to provide a continuous inner surface along nozzle 14 and die 18, the outer diameter of die 18 being equal to the outer diameter of the enlarged bottom section 19 of nozzle 14 likewise to provide a smooth continuous surface between the outer lower surface of nozzle 14 and die 18. The die 18 is secured to nozzle 14 by a plurality of pins 20 registering with aligned radial bores in nozzle 14 and die 18, the ends of pins 20 being coplanar with the corresponding nozzle and die surfaces.

A plurality of regularly circumferentially spaced elongated extrusion slots 21 are formed in the lower peripheral border of die 18. Slots 21 open at the bottom edge of die 18 and extend upwardly, inclined to the vertical, helically about die 18. Slots 21 are dimensioned and oriented in accordance with the desired configuration of the end product, the upper end of each slot 21 advantageously being in approximate vertical alignment with the base of the next successive leading slot or some distance leading or a short distance trailing said base. An example of a die which has been successfully employed is one having an outside diameter of 1.620 inches and an inside diameter of 1.375 inches, twelve slots 21 being provided at 30° to the horizontal, the slots being 3/32 inch wide and extending vertically from the bottom edge of the die 18 a distance of 5/16 inch. The opposite faces of each slot are parallel, the bottom trailing edge 22 thereof being radially directed.

A cross bar 23 is located in nozzle 14 between the top and bottom thereof, extending diametrically across the nozzle into a force fit with corresponding opposite opening formed in the wall of nozzle 14, the outer ends of cross bar 23 being coplanar with the outer face of the nozzle 14. A vertical support rod 24 depends from cross bar 23 coaxial with nozzle 14 to a point at about the level of the lower border of die 18, said rod being secured to cross bar 23 by a bolt 26 registering with an opening in the cross bar and engaging a tapped axial bore in the support rod. A threaded axial shank 27 depends from the bottom of rod 24.

A frustoconically shaped cutter disc 28 is supported by rod 24 below the bottom edge of die 18 to define therewith an annular extrusion opening 29, cutter disc 28 having an axial opening engaging threaded shank 27 and being secured thereto by a nut 30 engaging shank 27 and bearing on the underface of the cutter disc. The bottom peripheral border 32 of cutter disc 28 is cylindrical and of the diameter of and in alignment with the outer peripheral face of die 18. A horizontal circular face 33 is formed at the top of the cutter disc 28 and has formed therein a well engaging the bottom of the support rod. The peripheral upper face 34 of cutter disc 28 is conically shaped and extends from the periphery of the top face 33 to the upper edge of the peripheral vertical surface 32 and below the bottom of die 18 to a point below its bottom edge, the top face 33 being located above the level of the bottom edge of die 18.

Formed in conical surface 34 are a plurality of regularly spaced, helically spirally extending channels or grooves 36 corresponding in number to extrusion slots 21 and extending from shortly below top face 33 to about the vertical peripheral face 32, said grooves 36 being of arcuate cross section with the outer side faces thereof converging, and terminating at their inner ends in vertical faces and at their outer ends in horizontal faces. The outer ends of the grooves 36 are advantageously in vertical alignment with the bottoms of the corresponding slots 21 and slots 36 advantageously extend along the directions of the respective slots 21.

A cutter sleeve 37 slidably engages the outer faces of die 18 and of the enlarged section 19 of the nozzle and a correspondingly enlarged upper section 38, and has a bottom outerface downwardly inwardly tapered to a cutting edge 39. The upper end of cutter sleeve 37 is provided with a peripheral flange 40 having an annular groove 41 formed therein which is engaged by a vertically rocking yoke member, to vertically reciprocate cutter sleeve 37 in the known manner, between a nozzle open position with the cutter edge 39 positioned above the tops of slots 21, as illustrated by full line in FIGURE 2 of the drawings, and a nozzle closed position with cutter edge 39 positioned below the cutter disc peripheral surface 32, as illustrated by broken line in FIGURE 2.

Considering now the operation of the apparatus 13, nozzle 14 is connected to a hopper of dough under pressure and the cutter sleeve is reciprocated in the known manner. As cutter sleeve 37 moves upwardly above cutter disc edge 32, the annular opening 29 is increasingly uncovered and the dough is pressure-urged through nozzle 14 and extruded in a continuous state through opening 29 at an increasing volume rate due to the increasing area of the uncovered opening 29 to form an outwardly projecting ring. As the bottom of cutter sleeve 37 advances above the bottom of die 18 ribbons of dough will flow through and from slots 21 as an integral part of the dough ring, with the center of the dough ribbon extruded through each of the slots 21 advancing circumferentially with the raising of the cutter sleeve and returning with the lowering of the cutter sleeve 37. The extruded dough ring appears to turn about its annular axis and, as cutter sleeve 37 returns to its fully depressed position, it severs the dough ring, and the serrated part of the dough formation flows downwardly and is disposed along the underface of the shaped dough piece as it drops into the underlying receptacle of hot frying oil. It should be noted that the size of the initially formed dough ring before the extrusion of the ribbons through slots 21 is important. In the absence of the continuous annular ring of dough the ribbons of dough extruded through slots 21 maintain their separation and tend to fall apart. On the other hand, if the size of the initial continuous dough ring is too large relative to the full dough piece, the volume in the dough ribbons would be of little effect in providing the swirl appearance. It has been found, in a mechanism 13 with the die dimensions above set forth, that the distance between the bottom edge of die 18 and the outer periphery 32 of cutter disc 28 is advantageously between 3/32 inch and 1/4 inch, preferably about 3/16 inch.

The configuration of the dough piece produced as above may be widely modified by adjusting the various operating parameters and the dimensions and relationship of the mechanism 13, as will be clear from the above to one skilled in the art. For example, among the parameters which may be adjusted are the viscosity of the dough, the pressure in the dough hopper, the stroke of cutter sleeve 37 both as to speeds along the stroke and the open dwell, the configurations and spatial relationships of die 18 and cutter disc 28, and the like.

Figure 3:
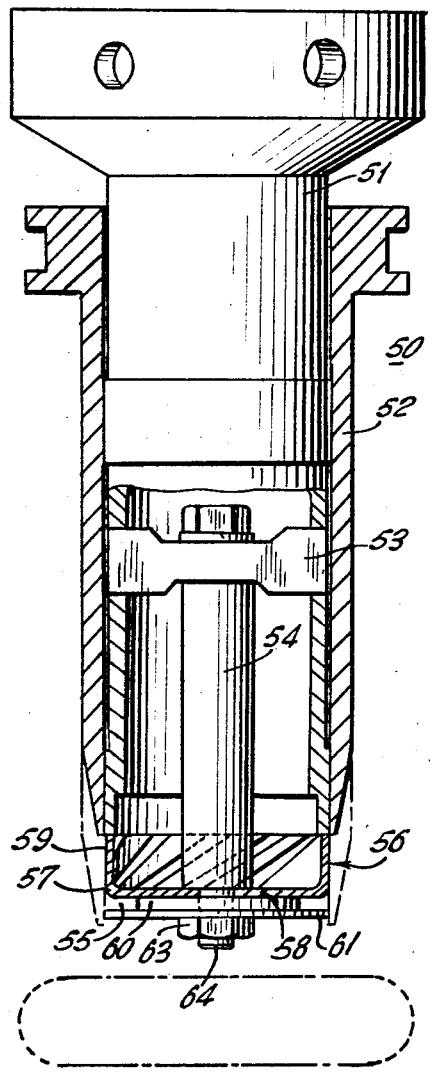
FIGURE 3 is a front elevational view, partially in section, of another embodiment of the present invention.

Another form of improved extrusion mechanism 50 which may be employed in practicing the present process is illustrated in FIGURES 3, 9 and 10 of the drawings, differing from mechanism 13 primarily in the construction of the extrusion die and cutter disc. Specifically, mechansim 50 includes a nozzle 51 and a cutter sleeve 52 similar in construction and association to nozzle 14 and cutter sleeve 37 previously described, and employed with a similar dough hopper and cutter sleeve reciprocating mechanism. As in the earlier embodiment, there is provided a cross bar 53 and a depending coaxial support rod 54 corresponding to cross bar 23 and support rod 24 respectively.

Mounted on the bottom of the support rod 54 is an extrusion assembly 56 which comprises a cup shaped die 57 including a circular bottom wall 58 and a vertical cylindrical peripheral wall 59 directed upwardly from the edge of the bottom wall 58. The outside face of peripheral wall 59 is coplanar with the outside face of the bottom border of nozzle 51. Underlying and coaxial with bottom wall 58 and of lesser diameter than said bottom wall is an annular spacer 60. A flat annular cutter disc 61 underlies and is coaxial with spacer 60 and is of a diameter equal to the outside diameter of peripheral wall 59 and is provided with a peripheral edge coplanar with the outside face of the peripheral wall 59. Extrusion assembly 56 is secured to support rod 54 by a nut 63 engaging the threaded coaxial shank 64 depending from support rod 54 and registering with aligned axial openings formed in the bottom wall 58, spacer 60 and cutter disc 61.

The confronting outer borders of cutter disc 61 and the die bottom wall 58 delineate a radially outwardly directed uninterrupted annular extrusion passageway 55. A plurality of regularly circumferentially spaced similarly shaped extrusion slots 65 are formed in the die peripheral wall 59. The slots 65 extend between top and bottom edges of the peripheral wall 59 and are inclined to the vertical thereby extending helically along their lengths, the upper open end of each slot 65 preferably being positioned at a point trailing the bottom end of the next successive trailing slot 65. Formed in bottom wall 58 of the die are regularly spaced slots 66 which join the bottoms of respective slots 65 and extend substantially to the spacer 60. The slots 66 are at angles to the radii of the bottom wall 58 and extend from their outer ends along substantially the directions in which the corresponding slots 65 extend in peripheral wall 59.

The operation and application of mechanism 50 is similar to that of mechanism 13 as described above. It should be noted, however, that with the initial opening of cutter sleeve 52 and before the exposure of slots 65 the dough is extruded as ribbons through slots 66 into passageway 55 where the ribbons are integrated into a unitary ring which is continuously outwardly extruded. With the further rising of the cutter sleeve individual dough ribbons are outwardly extruded through the slots 65 each being joined to the initially extruded dough ring. In other respects mechanism 50 operates in the manner of mechanism 13 and the configuration of the end product may be adjusted in the manner earlier set forth.

In FIGURES 8 and 11 there are illustrated dough pieces of different configurations which may be produced in accordance with the present method and employing the mechanisms described above. It should be noted, however, that while the subject method and mechanisms are particularly useful in the production of swirled dough rings a wide variety of other shapes may be produced.

While there have been described and illustrated preferred embodiments of the present invention, it is apparent that numerous alterations, additions and omissions may be made without departing from the spirit thereof.

We claim:

1. An apparatus for producing shaped dough rings comprising a tubular extrusion nozzle having a bottom discharge opening and provided with inclined slots in the bottom peripheral wall thereof, a disc member coaxially supported below said extrusion nozzle and having formed in its upper face grooves extending along the directions of said slots, and a sleeve member slideably engaging said extrusion nozzle and reciprocatable between an open position exposing said inclined slots and a closed position substantially in engagement with said disc member.

2. The apparatus of claim 1, wherein said disc member has a frustoconical upper face.

3. An apparatus for producing shaped dough rings comprising a tubular extrusion nozzle having a bottom discharge opening and provided with inclined slots in the bottom peripheral wall thereof, a bottom wall extending across the bottom of said extrusion nozzle and having openings formed therein connected to said inclined slots, a disc member coaxially supported below said extrusion nozzle, and a sleeve member slideably engaging said extrusion nozzle and reciprocatable between an open position exposing said inclined slots and a closed position substantially in engagement with said disc member.

4. The apparatus of claim 3, wherein said bottom wall openings comprise slots extending substantially along the directions of said inclined slots.

References Cited

UNITED STATES PATENTS

| | | | |
|---|---|---|---|
| 573,432 | 12/1896 | Megson | 107—52 |
| 2,921,541 | 1/1960 | Belshaw | 107—14 |
| 2,772,643 | 12/1956 | Coyne | 107—14 |
| 2,921,541 | 1/1960 | Belshaw | 107—14 |
| 3,143,085 | 8/1964 | Gebhardt et al. | 107—14 |

WALTER A. SCHEEL, *Primary Examiner.*

ARTHUR O. HENDERSON, *Assistant Examiner.*